March 6, 1934.  L. A. SHARP  1,949,883
JUNCTION BOX OF THE FLOOR TYPE
Filed July 5, 1929  3 Sheets-Sheet 1

Inventor
L. Alan Sharp
By his Attorneys
Cooper, Kerr & Dunham

March 6, 1934.  L. A. SHARP  1,949,883
JUNCTION BOX OF THE FLOOR TYPE
Filed July 5, 1929   3 Sheets-Sheet 2
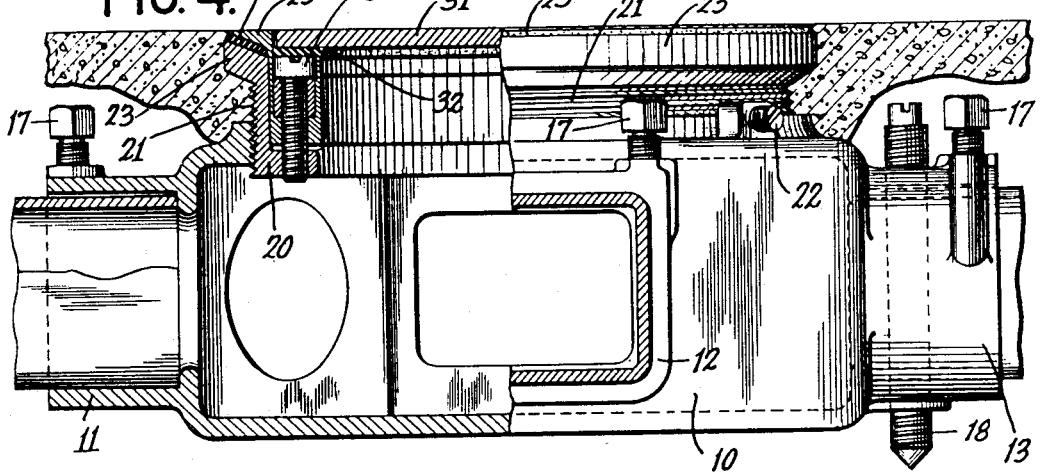
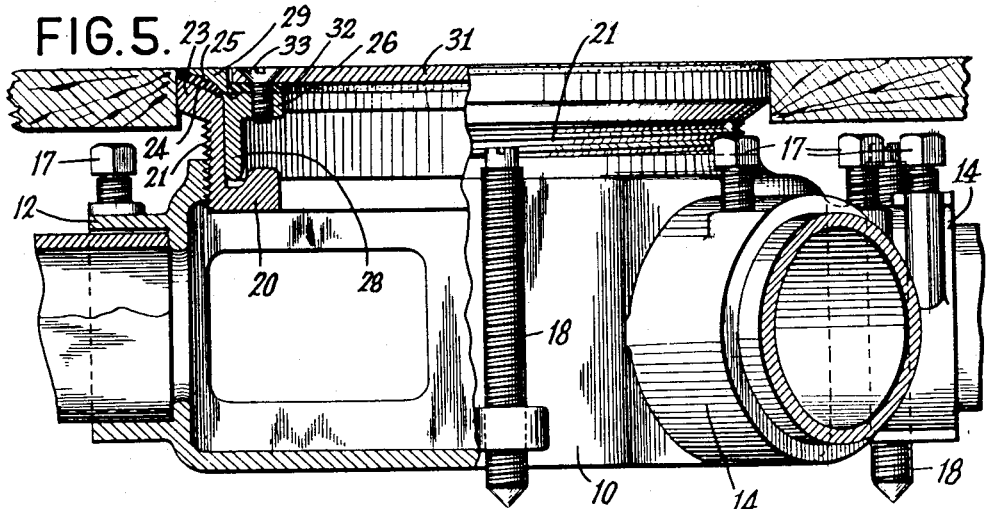
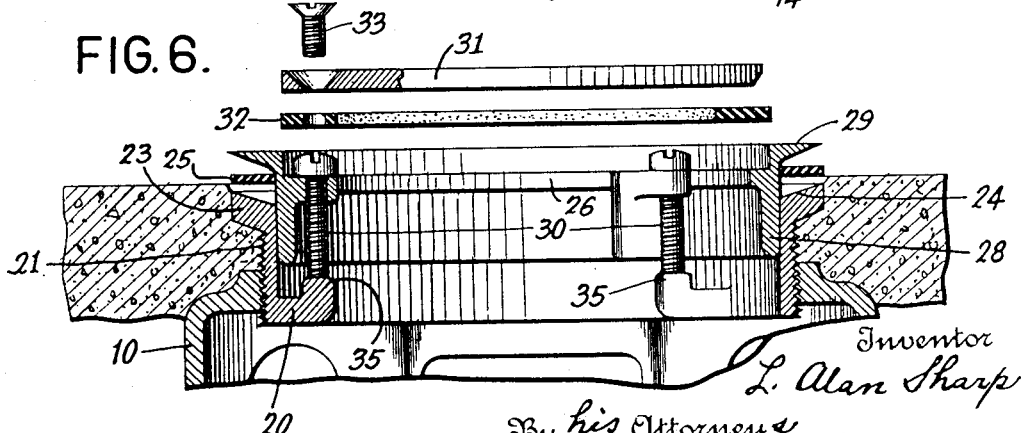
Inventor
L. Alan Sharp
By his Attorneys
Cooper, Kerr & Dunham March 6, 1934.                    L. A. SHARP                    1,949,883
                        JUNCTION BOX OF THE FLOOR TYPE
                  Filed July 5, 1929           3 Sheets-Sheet 3

Inventor
L. Alan Sharp
By his Attorneys
Cooper, Kerr & Dunham

Patented Mar. 6, 1934

1,949,883

UNITED STATES PATENT OFFICE 1,949,883

JUNCTION BOX OF THE FLOOR TYPE

L Alan Sharp, Avalon, Pa., assignor to National Electric Products Corporation, New York, N. Y., a corporation of Delaware Application July 5, 1929, Serial No. 376,240

22 Claims. (Cl. 247—19)

This iInvention relates to improvements in junction boxes of the floor type which are used in connection with conduit systems for the distribution of electricity.

In electrical conduit systems it is the present practice to place junction boxes in floors and to provide a removable covering plate to cover the top of the junction box, which when removed, affords access to the interior of the box. The lower parts of the junction boxes are connected to conduits and frequently concrete is embedded around the junction boxes. Various kinds of finished floor or floor coverings are used. In practice the thickness of concrete may vary and the thickness of finished floor or floor covering may vary and accordingly, to minimize expense and to facilitate installation, provision should be made whereby the overall height of the junction boxes can be varied to suit the particular installation conditions so that when the installation is complete the top of the top cover plate will be flush with the finished floor surface.

It is furthermore desirable that the adjustment of the box height be such that adjustments may be made either before or after the main body part of the box has been connected to the conduits.

Furthermore, provision should be made to provide for the complete sealing of the junction box against the entrance of moisture or water and also to provide for the easy removal of the floor plate.

This invention has for one of its objects the provision of an improved junction box which is particularly adapted to meet the service and installation requirements above set forth and other requirements which will be hereinafter set forth.

One object of the present invention resides in the provision of improved means for adjusting the box for overall height and for levelling of the box whereby adjustments of height do not effect the level of the parts and whereby levelling of the boxes may be first effected followed by a subsequent adjustment for height which does not necessitate relevelling.

Another object of the present invention resides in the provision of an improved closure for the boxes and improved means for sealing the completed box assemblies against the entrance of moisture.

A further object of the present invention resides in the provision of improved means for effecting removal of certain parts when such removal is desired.

A further object of the present invention resides in the provision of improved means for retaining floor covering or finished floor material in place.

A further object of the present invention resides in the provision of an improved means for holding linoleum and like floor covering in place and for utilizing such material for sealing the box.

A further object of the present invention resides in the provision of improved means for holding marble in position and for permitting its removal when desired.

A further object of the present invention resides in the provision of an improved junction box construction with interchangeable parts to adapt a common box body to other cooperating parts which are adapted for use with various kinds of finished flooring.

Other objects and advantages will be hereinafter set forth in the accompanying specification and claims and shown in the drawings, which by way of illustration show a preferred embodiment of the invention.

In the drawings:

Figure 1 is a top plan view of a floor junction box embodying my improvements;

Figs. 2 and 3 are detail sectional views showing the manner of connecting conduits thereto, the sections being taken on lines 2—2 and 3—3 of Fig. 1;

Fig. 4 is a detail sectional view taken substantially on line 4—4 of Fig. 1 and showing the junction box and associated parts embedded in a concrete floor;

Fig. 5 is another sectional view taken substantially on line 5—5 of Fig. 1 and this view shows the manner in which the same junction box may be mounted in a different kind of floor, for example, a wooden floor;

Fig. 6 is a disassembled view showing the manner of taking certain parts of the box apart;

Figure 2:
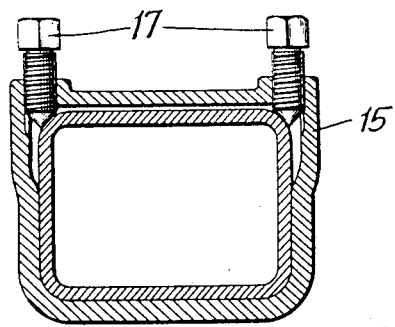
Figure 3:
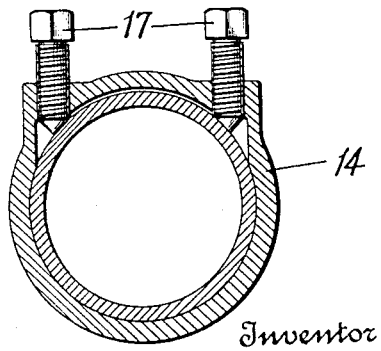

In more detail in the drawings, the junction box proper comprises a casting 10 provided with a number of female couplings 11, 12, 13, 14, 15 and 16 which receive conduits extending therein. Certain of the couplings provide for the reception of rectangularly shaped conduits and other of such couplings provide for the reception of round conduits as shown. For securing the conduits in position in such couplings, suitable set screw means such as 17, are provided (see Figs. 2 and 3), which set screws have conical ends adapted to bear at one edge on curved portions of a cooperating conduit. For lining up the junction box structure threaded and slotted studs such as 18 are provided, which studs can be adjusted up and down to support the junction box at the desired height above the supporting underfloor slab not shown. Such studs 18 are also adapted for leveling the junction box as will be readily understood, inasmuch as such studs afford a three-point support for the junction box.

Figure 1:
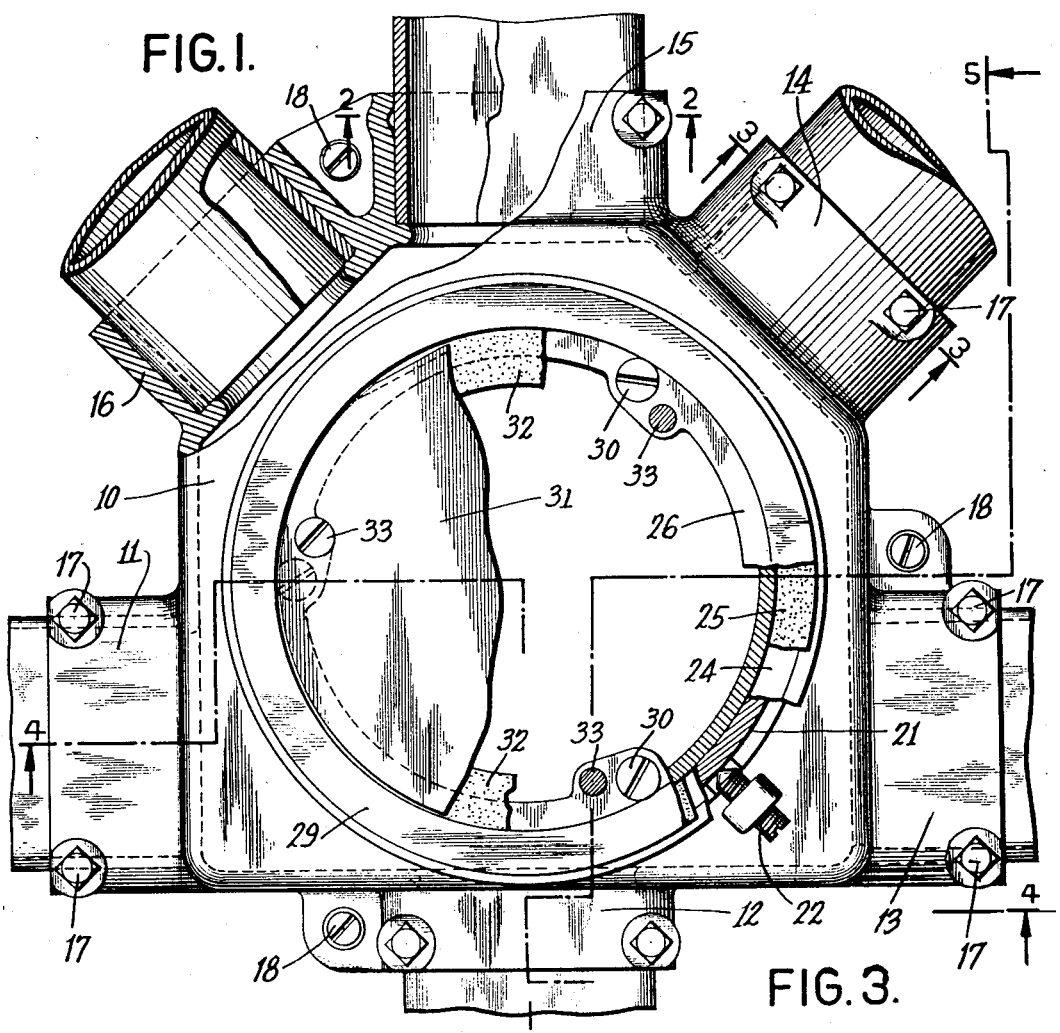

In the installation of junction boxes of this general character such junction boxes are installed prior to the laying of the finished layer of the floor and frequently are placed in position before embedding concrete material is placed therearound. With such constructions it is desirable to provide means whereby the junction box proper can be placed in a desired position and then to provide means so that the top of the junction box will exactly line up with the finished floor surface. Accordingly, each junction box is provided with a ring element generally designated 20. This ring element 20 is exteriorly threaded as shown at 21 in the various figures and these threads engage internal threads in an opening in the top of the junction box. Accordingly, the ring may be advanced in and out to a desired extent and in this way the top of the junction box can be established at a desired point or elevation according to the thickness of the material which is to overlie the junction box or according to the thickness of the floor as the case may be. After such ring element has been adjusted to the desired vertical position, it may be clamped in such adjusted position by tightening a set screw 22 (see Figs. 1 and 4). Preferably the ring element is covered up with a closure member or parts and with such closure parts in position, the location of the ring element for vertical height is established. If desired the studs 18 can also be used to establish the proper elevation of the box. Such adjustment of 18 is used particularly to line up the body of the box with the conduits but it may also be used for levelling the box before the ring adjustment is made. As stated above, a floor plate closure is used for covering the opening in the ring. When such floor plate is used, provision should be made to prevent the entrance of water or moisture into the interior of the junction box. The manner in which this is provided will now be described.

As shown in Figs. 4, 5 and 6 the ring element 20 is provided with an outwardly extending portion 23 which is inwardly tapered as shown at 24. This inwardly tapered part forms a seat for a gasket 25. The floor closure comprises a member 26 having a downwardly depending annular flanged portion 28, which is concentric with the vertical part of ring element 20 and disposed within it. Such part 26 also is provided with an extending bevelled portion 29 which is adapted to extend over the gasket 25. The part 26 can then be secured with respect to part 20 by tightening up suitable studs such as 30. The tightening up of these studs serves to clamp part 29 down upon the gasket 25 and thus provide a moisture proof seal. The final closure plate comprises a disc-like plate 31 which seats upon a gasket 32 resting upon a flange of member 26, and such plate is held in position by screws 33. It will be understood that by tightening the screws 33 the gasket 32 is clamped tightly and this gasket together with gasket 25 provides a complete moisture proof seal for the top of the junction box.

After junction boxes have been installed in a floor, occasion frequently arises for removing or adjusting the top parts of the assembly and due to the fact that the construction is substantially flush with the floor and due to the gaskets which are used, it is sometimes quite difficult to remove these parts and in particular to remove the part 26—28—29. To facilitate such removal the following construction is provided.

Directly under the centers of the screws 33 the ring 20 is provided with raised boss portions 35 (see Fig. 6). These bosses are utilized for freeing member 26 from its previously fixed position by proceeding in the following manner. The screws 33, closure plate 31 and gasket 32 are first removed. This provides access to the studs 30 heretofore described. All of these studs are then removed and one such stud 30 is reinserted in one of the threaded apertures in member 26 which previously received the screws 33. Such stud 30 is then threaded down until the lower end of the stud abuts a boss 35 in the manner indicated in Fig. 6. Further tightening of such stud will elevate part 26—28—29 until it is free and will also free the gasket 25.

Figure 9:
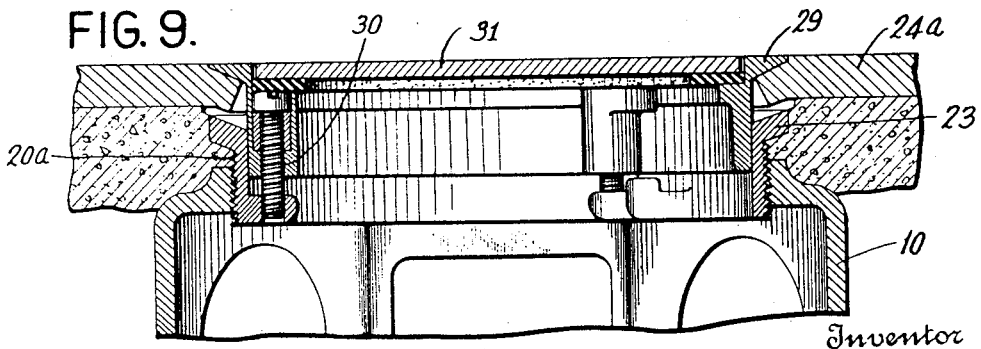
Fig. 9 is a sectional view showing the manner of utilizing the junction box and associated ring elements for clamping a floor covering such as linoleum in position.

The construction described also provides a means for securing a compressible floor covering such as linoleum, cork covering or the like in position and for providing a water tight seal. When such linoleum is used, it serves in lieu of the gasket 25 (see Fig. 9). Here the linoleum is shown at 24a and it will be understood that such linoleum engages in between shoulder 29 the corner of the concrete or it may even be clamped down to 23, and by tightening down upon the studs 30 when the latter have been reinserted in their original position the linoleum can be firmly clamped in position and in this way not only is the linoleum held in place, but a water tight seal is provided for the top of the junction box inasmuch as the linoleum serves the purpose of a gasket.

Figure 7:
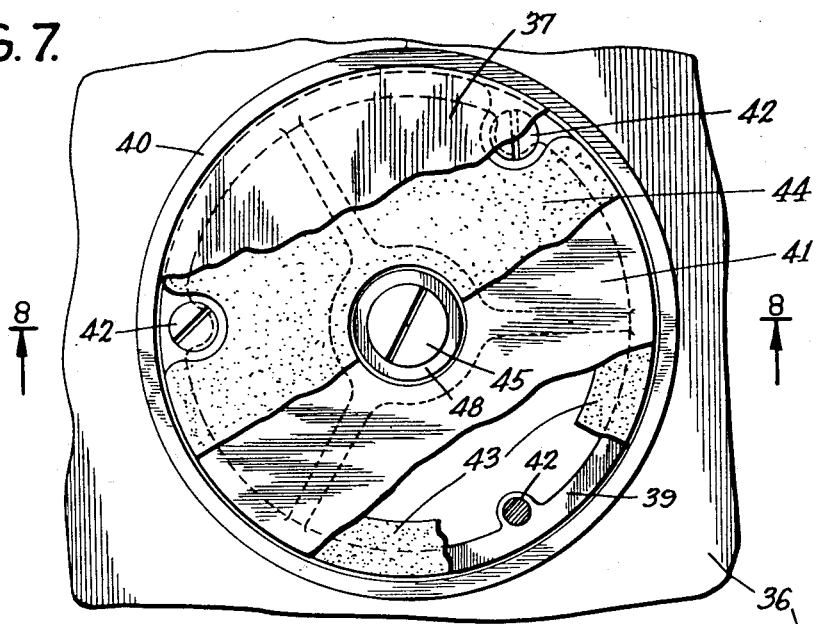
Fig. 7 is a top plan view of the junction box structure with a holder for a marble disc and which is adapted to be used when the junction box is placed in marble flooring.
Figure 8:
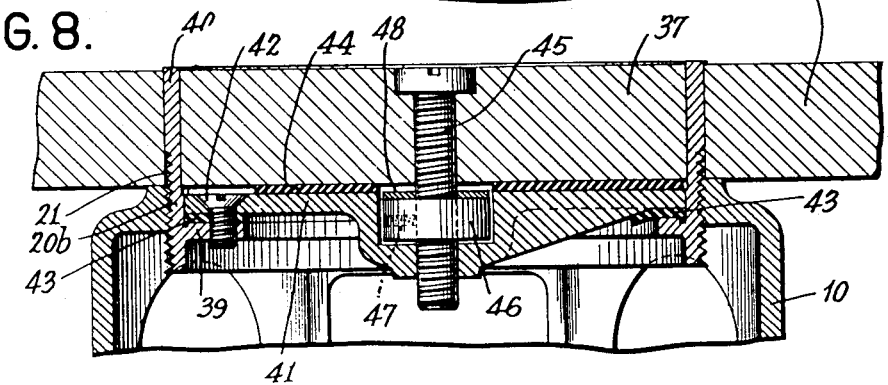
Fig. 8 is a detail sectional view of the marble disk holder shown in Fig. 7, the section being substantially on line 8—8 of Fig. 7.

With marble floor constructions, it is the general practice to provide an inserted disc of marble which is removable to afford access to the interior of the junction box. In Figs. 7 and 8 such marble floor construction is illustrated. In these figures, 36 is the marble floor proper. 37 is the marble disc. The ring-like element 20 previously described, is removed and in lieu thereof a marble holding ring 20b is substituted therefor. Such ring 20b is exteriorly threaded with threads 21 like those of ring 20 so that it can be adjusted up or down to the desired height. This member 20b is provided with a flange portion 39 and with an upstanding annular portion 40 which closely fits an opening in the main marble floor 36 and which also is adapted to receive the marble ring 37. After member 20b has been adjusted to the proper vertical position, a closure 41 is placed in position, it being suitably held by screws 42. There is also a gasket 43 used which seals the junction of parts 20b and 41. Overlying 41 is a cushion pad or rubber packing 44. This pad is suitably apertured to permit access to the screws 42 as shown in Fig. 7. The member 41 is also threaded to receive a cap stud 45 which projects up through an opening in the center of the marble disc 37. By tightening down upon this stud 45, the marble disc 47 can be firmly clamped down upon the pad 44 and if at any time it is desired to remove this marble disc 37 in order to obtain access to the junction box below, it is only necessary to back out upon stud 45 until a member 46 which is secured on the stud by means of a set screw 47, forces upwardly a fiber washer 48 and presses the marble ring 37 up out of the annular ring 40. This will elevate the marble ring out and free it from the pad 44. With the marble ring removed closure 41 is accessible for removal.

In the drawings the marble holding ring is shown projecting slightly above the top surface of the marble. After installation it is the practice to grind down the marble and this grinding operation grinds down the top of the ring so that it is flush with the finished surface of the marble.

When junction boxes of this type are to be installed it is the desirable practice to ship to the installer the boxes in completely assembled relation, i. e., the upper rings and closure plate are also assembled with the main body portion 10. It will be understood, of course, that interchangeable parts 20 or 20b will be furnished according to the kind of installation which is to be made. The contractor then places the boxes upon the sub floor and first levels up these boxes by adjusting the studs 18. This adjustment is primarily to bring the boxes to the proper level and subsequently the ring members 21 can be adjusted up or down to the proper position to bring the top of the closure assembly to the finished floor line. The finished floor, it will be understood, may be laid subsequently and at this time the desired adjustment of the ring 21 may be made. If linoleum is to be subsequently applied over the finished floor, viz:—over a concrete floor of the type shown in Fig. 4 it is only necessary to elevate the assembly 26, 28, 29 to permit the linoleum to be passed under the lip 29, and afterwards such parts are again tightened down in the manner indicated in Figure 9.

By providing the studs 18 for leveling purposes and by the use of the threading ring adjustment for overall box height it is possible to level the entire assembly including the rings and closure members as a first operation which operation is wholly independent of the ultimate overall height adjustment of the box. Subsequently the height adjustment may be made and such adjustment will not necessitate releveling. In previous construction, changes of box level effected the height and changes in height effected the level so that heretofore the installation of boxes was a laborious and time consuming operation.

After the installation is complete the junction box assembly is effectively sealed against the entrance of moisture or wash water upon the floor, inasmuch as a double seal is provided, one seal being between 20 or 20a and 26 and the other seal being provided between 26 and 31. Likewise with the marble ring construction there is also a double seal, one being between 20b and 41 and the other being between 41 and the marble disc 37. The construction also provides for the ready removal of one or more of the closure parts when such removal is desired.

What I claim is:

1. A floor box structure for a conduit system comprising a main body portion having a threaded aperture therein, a ring-like member having threads engageable with the aforesaid threads of the body portion to afford adjustment of the overall height of the box, an element vertically slidable with respect to said last mentioned ring-like member and provided with a portion overhanging the ring and having packing means coacting both with the element and with the ring-like member, and another element carried by the first element and also having a packing therebetween.

2. A floor box comprising a body portion, means carried by the body portion for levelling the body portion and for leveling all parts carried thereby, a ring member threaded in the main body portion to provide for adjustment and variation of the overall height of the box and adapted to maintain the level of the ring member during such adjustment, a closure means for the ring member comprising a part which telescopes within the ring-like member and which is adapted to be secured thereto, and a packing between the said part and the ring-like member for the purpose described.

3. A floor box for electric conduit systems and the like comprising in combination, with box parts, of cooperating parts which are directly slidably telescoped with each other, said cooperating parts having packing receiving flanges between which packing material is received, means for drawing said flanges together for clamping the packing material therebetween and for slidably telescoping the parts with respect to each other, and means comprising devices supplemental to the last mentioned means for forcing a sliding telescopic movement of the parts in an opposite direction for forcing the flanges apart to free the packing material clamped therebetween whereby facility of opening up the box is obtained.

4. A floor box comprising a body portion, arch openings thereinto adapted to receive conduits, a member interengaging said body portion adapted for adjustment with respect thereto, and means for levelling the box, said levelling means being cooperatively associated with the body of the box and carried thereby and arranged to level the body of the box with respect to a supporting floor on which the box body is supported, and the interengaging member being cooperatively associated with the box body portion to maintain the angular relation of the engaging member and the box body portion during relative adjustment of the engaging member and the box body portion so that a subsequent height adjustment of such engaging member part may be made while the previously established level is maintained.

5. A floor box comprising a box assembly including a ring-like element with an outwardly extending flange portion at the top thereof providing an inclined seat for a packing, the inner bore of the ring being in alignment with the inner bore of the outwardly extending flange portion to provide a cylindrical recess in the ring-like member in which another member may be snugly telescopically fitted, a member telescopically fitted in the aforesaid cylindrical recess in the ring-like member and also having an outwardly extending flange portion for forming another inclined packing seat over the first mentioned inclined packing seat, a packing between said flanges and a floor closure plate disposed concentrically within the flange portion of the second mentioned member and aligning with the top thereof and secured thereto.

6. A floor box comprising a body portion, an extension ring threaded therein and provided with a cylindrical smoothly bored out portion, another part slidably telescopically fitted within said bore of the ring-like extension and removably secured thereto, cooperating packing receiving flanges upon the extension and said other part, said other part having an inwardly extending flange portion, a closure plate carried by said last mentioned flange portion, and packing between said last mentioned flange and closure plate.

7. A floor box comprising a main body portion having a threaded aperture therein, a ring which is also threaded to engage the aperture in said body portion to provide for variation in over-all height adjustment of said ring, said ring having a packing receiving flange outwardly extending therefrom, said ring having a cylindrically shaped interior recessed portion extending up to the interior top of the flange portion to telescopically receive a closure member, closure members, one of which has an outwardly extending flange portion disposed over the packing receiving flange of the ring portion and which closure member is telescopically fitted within the cylindrical recessed portion of the ring, and another of which closure members is concentrically nested within the first mentioned closure member and adapted for final disposition to lie flush with the top level of the extending flange of the other closure member, packing means between the flange of the first mentioned closure member and the flange of said ring, and other packing means between the two closure members for providing a water tight seal of the closure parts.

8. A floor box comprising a main body portion with a ring-like element threaded therein and provided with an outwardly extending flanged extension and having an inner cylindrical recessed portion which extends up to the inner top of said flanged extension so that another element may be slidably telescoped therein, another ring-like element telescopically fitted in the cylindrical recess in the first mentioned ring-like member and also provided with an outwardly extending flange extension disposed over the first mentioned extension so that a packing can be clamped therebetween, said second mentioned ring-like element also being provided with an inwardly extending flange portion, a closure member concentrically nested within the second mentioned ring-like member over the inwardly extending flange portion thereof and packing means between the said closure member and said inwardly extending flange portion.

9. A floor box with a plurality of parts adapted when assembled together to comprise a closure for the box, said parts including removable means to secure the parts together by a slidable displacement of the part while the relative angular relation of the parts is maintained, said removable means when removed leaving said parts in their assembled position, packing means disposed between cooperating closure parts, and means constituting in part said removable means for forcibly separating said cooperating parts and freeing them from the packing means after removal of said removing means by forcibly effecting an axial relative translation of the parts while maintaining the relative position of the parts about the axis thereof.

10. A floor box made up of a plurality of parts including a main body part, a ring-like element threaded to engage the body part and to be adjustable therein, said ring-like element having an outwardly extending flange portion inclining upwardly from the ring towards the outer portion adjacent the floor level so that flexible material may be received thereby, said element being provided with a cylindrical recess which extends up to the inner top of the flanged portion, another part telescoping within the aforesaid cylindrical recess of the ring-like element and also extending over the inclined outwardly extending flange thereof to clamp the said flexible material thereto, and another part fitting within the telescopic part and secured thereto and forming a final closure plate for the box.

11. A floor box comprising in combination, a plurality of interlocking sections adapted for adjustment relatively to each other whereby the height of said box may be varied and with the level of the uppermost section maintained, and supplemental means carried by one section for levelling the assemblage of all the sections with respect to a supporting floor slab.

12. A floor box including a plurality of cooperating parts, certain parts being adjustably mounted in other parts to provide for variation in overall box height, and other parts which are carried by one part being adapted for levelling the entire assemblage of all parts with respect to a support, said adjustably mounted parts providing overall height adjustment while maintaining their level adjustment.

13. A floor box comprising in combination, a lower section, an upper section, means carried by the lower section for levelling all of said sections with respect to a support, means for adjusting said sections relatively to each other to change the operative height of said box, while maintaining the relative level of the sections, and means for preventing passage of moisture past said upper section into said lower section.

14. A floor box having a body portion with a ring-like member with an outwardly extending flanged top portion, another member having portions slidably telescoping within the ring-like member and having other flange-like portions extending over the outwardly extending flanged top portion of the first mentioned ring-like member to thereby secure packing or linoleum therebetween.

15. A multi-part floor box of which parts are relatively movable toward and away from each other in a straight line direction to adjust the overall height of the box, and adjustable means carried by the box for adjusting and fixing the angle of said straight line direction of height adjustment with respect to the plane of the upper surface of the floor in which the box is to be mounted.

16. A floor box of multiple section type, means for maintaining said sections always in a fixed and maintained angular relation with respect to each other, means providing in and out adjustment of said sections with respect to each other at such maintained angular relation whereby the overall height of the box may be adjustably varied, and means associated with and carried by one section of the box for adjusting the level of that section of the box and thereby providing a concurrent level adjustment for the entire assemblage of sections irrespective of what height adjustment may be made by the foregoing section adjusting means.

17. A floor box comprising multiple sections with means cooperating between the sections for permanently maintaining the angular relation of the various sections with respect to each other, said means including means to adjust said sections in or out with respect to each other at such maintained angular relation, and means associated with one box section only to adjust the level of the section, and by such leveling adjustment, and because of the maintained angular relation of the other sections by the foregoing means, effecting a concurrent leveling of all sections.

18. A floor box having a body portion and a member through which access to the interior of the box may be had, means connecting said body portion and member for relative vertical adjustment, a second member relatively vertically adjustable with respect to said first mentioned member from a position adjacent thereto and with the upper surface of said second member in the level of an uncovered floor surface to a position in which the marginal edge of a floor covering such as linoleum is gripped between said members and clamped to the floor surface.

19. The combination set forth in claim 18 in which the said first and second mentioned members are provided with seats for receiving and clamping a packing in one relative adjustment of said members and of which the seat on the second mentioned member constitutes a floor-covering-clamping means in another relative adjustment of said members.

20. A floor box having a body portion and a member carried thereby through which access to the interior of the box may be had, a second member carried by said first member, means for supporting said body portion and members on an unfinished sub-floor surface and for initially and once-for-all leveling the assemblage of body portion and members, means for simultaneously vertically adjusting the said members with respect to said body portion to a predetermined over-all height with respect to an uncovered floor surface, and means for vertically adjusting said second mentioned member with respect to said first mentioned member, after said body portion and first mentioned member have been embedded in the floor, to a predetermined over-all height with respect to a covered floor surface.

21. The combination set forth in claim 20 in which the second mentioned member is provided with means for clamping a floor covering against the underlying finished floor surface, and in which said last mentioned means constitutes means for clamping packing against said first mentioned member when no floor covering is employed.

22. A floor box comprising a body portion and a ring-like member and another box section which constitutes a closure for the ring-like member, said ring-like member being adjustable in or out of said body portion with a maintained angular relation of body portion and member at various positions of in and out adjustment and said second box section being likewise adjustable in or out of the ring-like member with a maintained angular relation of the ring and box section at various positions of in or out adjustment, said ring-like member and box section including portions to receive and clamp a packing therebetween with the upper surface of the section flush with a floor surface in one position of relative in or out adjustment, one of said portions of the box section in another position of in or out adjustment being adapted to clamp over a floor covering such as linoleum and secure the same to the floor.

L ALAN SHARP.